Feb. 20, 1934.  A. F. PAYNE  1,947,534
VALVE COTTER FOR INTERNAL COMBUSTION ENGINES
Filed May 9, 1932

Patented Feb. 20, 1934

1,947,534

UNITED STATES PATENT OFFICE 1,947,534

VALVE COTTER FOR INTERNAL COMBUSTION ENGINES

Alexander Flexman Payne, Redditch, England

Application May 9, 1932, Serial No. 610,109, and in Great Britain May 9, 1931

9 Claims. (Cl. 251—144)

This invention relates to cotters or collars for the valves of internal combustion engines, and of that kind comprising two parts or half-sleeves adapted to be fitted against or around the stem of the valve for the purpose of retaining in place the spring, the said parts or half-sleeves being usually engaged with a tapering or other necked part around the lower end of the valve stem and being usually held in place by an internally-coned or other cap or socket having an external flange or bearing surface which constitutes a seating for the one end of the valve spring.

The object of the present invention is to provide a two-part cotter of the above kind which may be cheaply manufactured, which is light in weight and which, moreover, is provided with means whereby the cotter parts may be readily fitted around the stem of the valve, or removed therefrom, when desired.
According to this invention the cotter parts or half sleeves are formed from sheet metal and are connected together by a pair of resilient or angularly-movable arms or branches which extend away from the cotter and form a convenient handle or holder. The arms or branches are adapted to move apart to permit of the half-sleeves being engaged over the stem of the valve, the said arms or branches permitting of the cotter parts being then moved into close engagement with the valve stem, so that they may be fitted within the member or socket which forms a seating for the spring of the valve. Owing to the cotter parts being held together by the arms or branches they may be engaged with the stem of the valve by one hand, leaving the other hand free for the compression of the valve spring, so that the usual difficulty of fitting the cotter parts in place, where they are quite separate from one another, is avoided. The arms or branches also enable the cotter parts to be easily removed, without the danger of the parts being lost. The sheet metal half-sleeves may have inclined walls where the necked part of the valve stem is tapered, and they may be provided with external ribs or flanges to engage the inner wall of the socket forming the spring abutment. Where the said inner wall of the latter is tapered the edges of the ribs or flanges may be suitably inclined to engage closely against the same. By providing the half-sleeves with external ribs or flanges the two part cotter is considerably strengthened without materially increasing its weight.

Figure 1 of the accompanying drawing shows a valve fitted with a cotter or collar comprising two sheet metal half-sleeves constructed and connected together by a pair of arms or branches in accordance with this invention.

Figure 1:
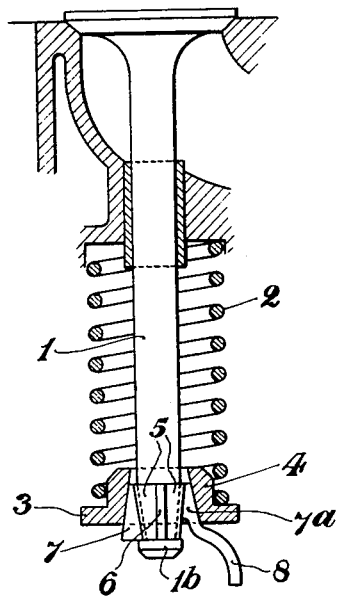
Figure 2:
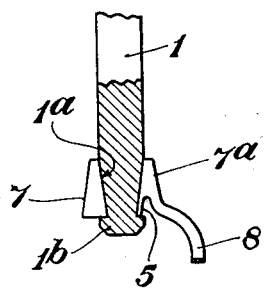
Figure 2 is a sectional view of the lower part of the valve stem, showing one half of the cotter and the manner in which it fits around the necked portion of the stem.
Figure 3:
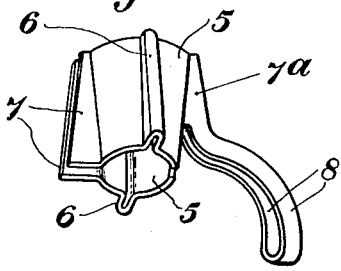
Figure 3 is a perspective view of the improved cotter or collar when detached and upon a larger scale.
Figure 4:
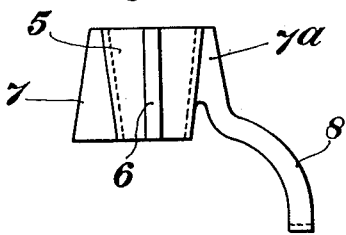
Figure 4 represents a side view of the improved cotter when detached.
Figure 5:
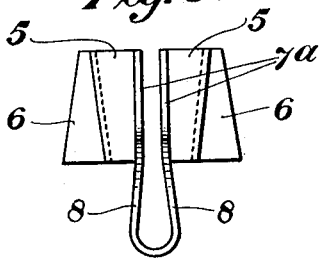
Figure 5 is a front view.

Referring to the drawing, the valve 1 is fitted with a coiled compression spring 2, the lower end of which takes a seating on a flange 3 integral with a short tubular part or sleeve 4 surrounding the valve stem, the said part 4 having a tapering inner wall and constituting a socket or housing for receiving a cotter or collar adapted to retain the spring 2 in place, in known manner. This cotter or collar consists, according to this invention, of two half-sleeves 5 formed from sheet metal and adapted to be engaged around the lower end of the valve stem which is necked at 1ᵃ to receive them, leaving an annular retaining shoulder 1ᵇ which engages beneath the lower edges of the half-sleeves. This necked portion 1ᵃ of the valve stem is of a taper formation, as illustrated in Figure 2, the walls of the half-sleeves 5 being of a corresponding taper so that they may fit closely around the said necked portion. To enable the half-sleeves 5 to take a firm seating against the tapering inner wall of the flanged part 4 which engages the valve spring, each half-sleeve is folded or bent out at the middle to provide an integral radial rib or flange 6 disposed in the axial direction of the cotter. Also, in addition to the ribs or flanges 6 the opposed edges of the two half-sleeves which are arranged side by side, are bent outwards to provide integral radial flanges 7 and 7ᵃ. The outer edges of the two ribs 6 and the outer edges of the flanges 7 and 7ᵃ are oppositely inclined to the walls of the half-sleeves to an extent corresponding to the taper of the inner wall of the spring engaging part 4, so that when the cotter is fitted in place the said outer edges of the ribs and flanges fit closely against the said inner wall throughout the greater portion of their length.

Figure 6:
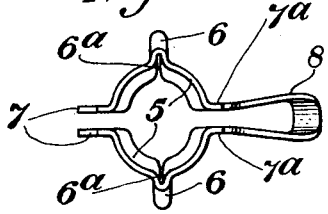
Figure 6 represents a plan view of same.

To enable the two half-sleeves 5 to be readily fitted into place around the stem 1 of the valve, and easily removed therefrom when desired, the said half-sleeves are connected together at one side by a pair of resilient or spring branches 8 formed integral with one another and with the flanges 7ᵃ of the respective half-sleeves, both half-sleeves and branches being pressed up or fashioned from a single sheet metal blank. The two arms or branches 8 thus provided are arranged to hold the sheet metal half-sleeves side by side preferably so that they are normally separated by a slight clearance, whilst the said arms or branches, which may be slightly inclined relatively to one another as shown in Figure 6, are curved or inclined downwards and outwards away from the two half-sleeves 5, so that when the latter are fitted in position the outer ends of the two arms or branches project below the spring retaining part 4 and at the same time lie well away from the stem of the valve. The arms or branches 8 thus form a convenient holder or handle for enabling the half-sleeves to be fitted into place or removed.

In order to engage the half-sleeves 5 around the necked portion 1a of the valve stem, the flanged member 4 is first lifted and the spring 2 compressed by a suitable tool, when the two half-sleeves, whilst being held by the connecting arms or branches 8, are forced over the said necked portion, the resiliency of the arms or branches and their capability of relative angular movement allowing the half-sleeves to be easily moved further apart by engagement with the curved surface of the valve stem; or if desired the half-sleeves may be moved sufficiently wide apart by pressing the finger between the branches. When the half-sleeves 5 have been engaged over the stem they are immediately caused to spring closer together owing to the resiliency of the branches 8, and they may, if necessary, be pressed closely against the necked portion of the valve stem by pressing the branches together by the fingers. As soon as the half-sleeves 5 have been engaged with the said necked part of the valve stem the spring 2 may be allowed to expand so that the member 4 is caused to move down over the upper ends of the half-sleeves. The tapering inner wall of the said member 4 then engages closely against the inclined edges of the ribs or flanges 6, and also against the edges of the flanges 7 and 7a, and the inclined walls of the half-sleeves are pressed into close engagement with the tapering wall of the necked part 1a of the valve stem. In this manner a firm and secure connection is provided and the cotter is effectively prevented from moving out of place.

Owing to the half-sleeves 5 being connected by the resilient angularly-movable arms or branches 8 they are prevented from being lost or falling apart during fitting or removal, and they may, moreover, easily be engaged around the stem of the valve by one hand. The half-sleeves may be readily pulled away from the valve stem, after the compression of the valve spring 2, by means of the branches 8, which may, if necessary, be pressed slightly apart by the finger.

By making the half-sleeves of sheet metal they may be cheaply manufactured and are exceedingly light in weight, whilst being of adequate strength owing to the ribs or flanges with which they are provided. The inner walls of the ribs 6 may be slightly separated to provide a small groove 6a down the inner face of each half-sleeve, as shown in Figure 6, so that oil may pass freely up the stem of the valve.

Instead of the arms or branches 8 being bent downwards they may be straight so as to extend radially outwards from the half-sleeves or valve stem.

Having fully described my invention, what I desire to claim and secure by Letters Patent is:—

1. A cotter for a valve of an internal combustion engine, comprising two curved sheet metal parts formed with radial ribs and with flanges at their opposed edges and connected together by relatively angularly-movable arms constituting a holder.

2. A cotter for a valve of an internal combustion engine, comprising two sheet metal half-sleeves having inclined walls and formed with flanges at their opposed edges, said flanges having edges oppositely inclined to the walls of the half-sleeve the said half-sleeve being connected together by relatively angularly-movable branches.

3. A cotter for a valve of an internal combustion engine, comprising two sheet metal half-sleeves, integral outwardly-projecting ribs on the half-sleeves and integral outwardly-projecting flanges at opposed edges of the half-sleeves, the said half-sleeves being connected together by integral resilient branches extending downwardly and outwardly therefrom.

4. A cotter for a valve of an internal combustion engine, comprising two sheet metal half-سleeves having inclined walls, outwardly-extending integral flanges on the half-sleeves at their opposed edges, said flanges having edges oppositely inclined to the walls of the half-sleeves, and integral resilient branches connecting the half-sleeves and extending outwards from the latter to constitute a holder.

5. A cotter for a valve of an internal combustion engine, comprising two sheet metal half-sleeves spaced apart side by side with their opposed edges bent into flanges, ribs between the flanges and a pair of integral spring arms connecting together the half-sleeves and extending away from the latter to constitute a holder, the walls of the half-sleeves and the edges of the ribs and flanges being oppositely inclined.

6. A cotter comprising two sheet metal half-sleeves having inclined walls, flanges on the half-sleeves at their opposed edges, said flanges having inclined edges and resilient branches connecting together the half-sleeves and forming a holder, in combination with a valve stem having a tapered necked portion engaged by the inclined walls of the half-sleeves, a valve spring and a valve spring abutment comprising a sleeve with a tapering inner wall engaging the inclined edges of the flanges.

7. A cotter for a valve of an internal combustion engine, comprising two curved sheet metal parts formed with outwardly projecting ribs and connected together by relatively angularly-movable arms constituting a holder.

8. A cotter for a valve of an internal combustion engine, comprising two sheet metal half-sleeves having inclined walls and formed with outwardly projecting ribs having edges oppositely inclined to the walls of the half-sleeves, the said half-sleeves being connected together by relatively angularly-movable branches.

9. A cotter for a valve of an internal combustion engine, comprising two sheet metal half-sleeves, integral radially-projecting ribs on the half-sleeves formed by bending up the metal of the latter, and relatively angularly-movable arms connecting together and integral with the half-sleeves.

ALEXANDER FLEXMAN PAYNE.